United States Patent
Weber

(10) Patent No.: US 7,541,101 B2
(45) Date of Patent: Jun. 2, 2009

(54) ANTI-ABRASIVE LAYER

(75) Inventor: Frank-R Weber, Oberkraemer (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/403,829

(22) Filed: Apr. 14, 2006

(65) Prior Publication Data

US 2006/0222891 A1      Oct. 5, 2006

Related U.S. Application Data

(63) Continuation of application No. PCT/DE04/002308, filed on Oct. 13, 2004.

(30) Foreign Application Priority Data

Oct. 15, 2003   (DE) ................................ 103 47 981

(51) Int. Cl.
*B32B 9/00*   (2006.01)

(52) U.S. Cl. ............................ 428/698; 51/307; 51/309; 428/216; 428/336; 428/697; 428/699

(58) Field of Classification Search .............. 106/286.2, 106/286.4, 286.5, 286.8, 287.1, 287.17; 428/216, 428/336, 697, 698, 699; 51/307, 309
See application file for complete search history.

(56) References Cited

U.S. PATENT DOCUMENTS 6,033,734 A * 3/2000 Muenz et al. ............... 427/309
6,033,768 A * 3/2000 Muenz et al. ............... 428/216
6,492,011 B1 * 12/2002 Brandle et al. ............. 428/336
6,824,601 B2 * 11/2004 Yamamoto et al. .......... 428/698
7,008,688 B2 * 3/2006 Toihara ...................... 428/216
7,217,466 B2 * 5/2007 Weber et al. ................ 428/697

FOREIGN PATENT DOCUMENTS

| DE | 19609647 | 9/1997 |
| DE | 19818782 | 10/1999 |
| EP | 0756019 | 1/1997 |
| EP | 1219723 | 7/2002 |
| JP | 04-128363 | * 4/1992 |

OTHER PUBLICATIONS

M.I Lembke, et al. "Significance of Y and Cr In TiAlN Hard Coatings for Dry High Speed Cutting", Surface Engineering 2001 vol. 17 No. 2, XP008032308, pp. 153-158.

P.Eh. Hovsepian, et al. "Recent Progress in Large-Scale Production of Nanoscale Multilayefr/Superlattice Hard Coatings", Vacuum 69 (2003), XP008049315, pp. 27-36.

(Continued)

*Primary Examiner*—Archene Turner
(74) *Attorney, Agent, or Firm*—Oblon, Spivak, McClelland, Maier & Neustadt, P.C.

(57) ABSTRACT

An anti-abrasive layer which is useful for tools contains nitrides of the metal elements Cr, Ti and Al; and at least one element (κ); wherein a proportion of Cr in said anti-abrasive layer is more than 65 at %; a proportion of Al is 10 to 25 at %; and a proportion of Ti is 10 to 25 at %, based on a total amount of metal atoms in said anti-abrasive layer.

13 Claims, 1 Drawing Sheet

OTHER PUBLICATIONS

W.-D. Muenz, et al. "Properties of Various Large-Scale Fabricated TiA1N-and CrN-Based Superlattice Coatings Grown by Combined Cathodic Arc-Unbalanced Magnetron Sputter Deposition", Surface and Coatings Technology 125 (2000), XP001065416, pp. 269-277.

S. Yang, et al. "Properties and Performance of CrTiAlN Multilayer Hard Coatings Deposited Using Magnetron Sputter Ion Plating", Surface Engineering 2002 vol. 18 No. 5, XP008049319, pp. 391-396.
EP 04128363, Apr. 28, 1992, Europe/English Abstract only.

* cited by examiner

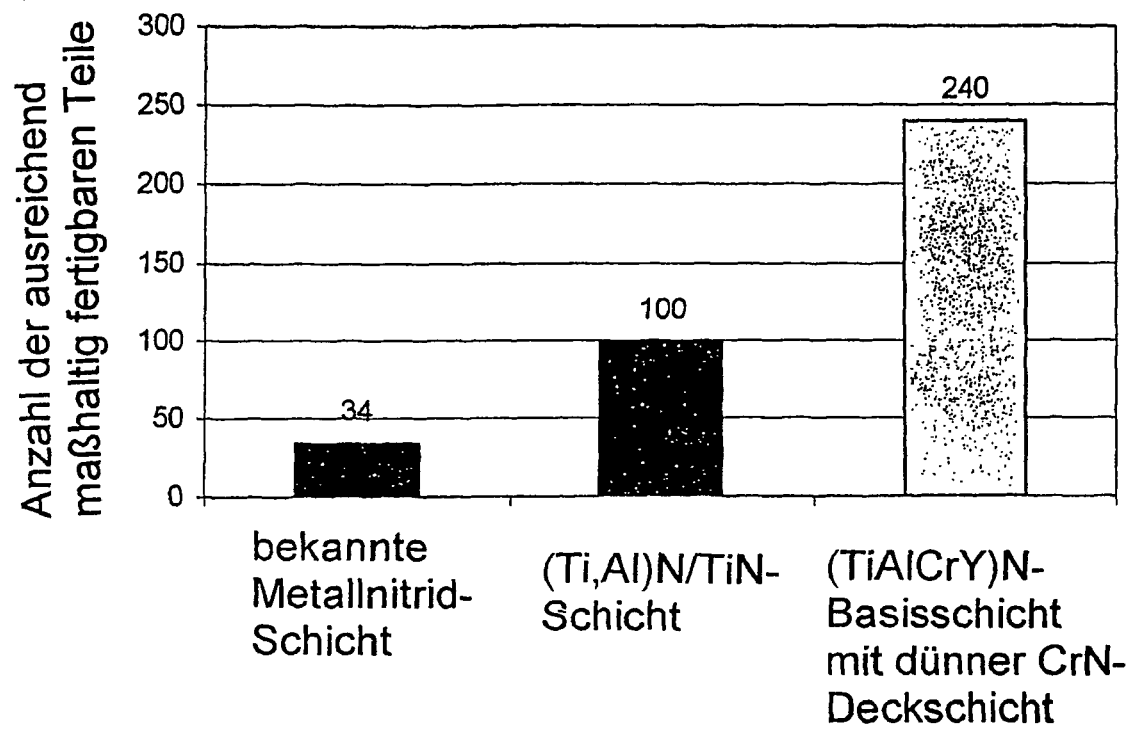

ANTI-ABRASIVE LAYER

BACKGROUND OF THE INVENTION

1. Field of the Invention

The present invention relates to a hard anti-abrasive layer and a tool coated with the anti-abrasive layer.

2. Discussion of the Background

Specialists in the field have endeavoured for some considerable time to find an anti-abrasive layer for dry working of metals. "Dry stationery working" or "dry working" means cutting without cooling liquid and lubricant but also cutting with minimum quantities of lubrication.

The development of the anti-abrasive layer, in particular the selection of the layer material, was based on the consideration that the tool reaches considerably higher temperatures during cutting and that this undesirable temperature increase can be reduced if as high a proportion of the heat as possible is removed not via the tool but via the chips obtained during the cutting. The possibility has therefore been considered of combining materials which had been known to possess either a high hot hardness and/or a high resistance to oxidation and/or a low thermal conductivity.

The most widely used anti-abrasion layer consists of a golden yellow titanium nitride TiN. TiN layers can be used universally. Layers of the dark bluish red iridescent titanium aluminium nitride (Ti,Al)N are known for their high hot hardness. Usually, they possess a percentage ratio of titanium to aluminium atoms of 50:50 or $(Ti_{0.5}, Al_{0.5})N$, occasionally also displaced in the direction of 40:60 or $((Ti_{0.4}, Al_{0.6})N$. To improve the quality of tools, they are used both as individual layer (see e.g. Gilles et al, Surface and Coatings Technology 94-95 (1997) 285-290) as well as a (Tl,Al)N/TiN multiple layer with intermediate layers of titanium nitride (compare e.g. the so-called FIRE layer of Gühring oHG).

CrN layers are recommended for working non-iron metals (see e.g. P. Hones, Surface and Coatings Technology 94-95 (1997) 398-402).

MeCrAlY alloys (Me=metal) are also known for coating turbine blades. They increase the resistance to oxidation and the thermal insulation and consequently the permissible temperature and the efficiency of aeroplane engines (see e.g. W. Brandl et al, Surface and Coatings Technology 94-95 (1997) 21-26).

Recently, a multilayer of (Ti,Al)N and CrN has become known (see e.g. I. Wadsworth et al, Surface and Coatings Technology 94-95 (1997) 315-321). Its resistance to oxidation increased with the proportion of Cr, at least up to proportions of Cr of 30 at %. In the same laboratory, layers of TiAlN with small admixtures of Cr and Y have also been examined (see DE 19818782, filed Apr. 27, 1998).

SUMMARY OF THE INVENTION

It is therefore an object of the present invention to provide an anti-abrasion layer which is easy to manufacture, exhibits superior anti-abrasion behaviour, in particular during the so-called dry working and with minimum lubrication and is suitable in particular for highly abrasive applications such as e.g. working of titanium alloys, GGV (vermicular graphite cast) and MMC (metal matrix compound) as well as for so-called high speed cutting (HSC).

This and other objects have been achieved by the present invention, the first embodiment of which includes an anti-abrasive layer, comprising:

nitrides of the metal elements Cr, Ti and Al; and
at least one element (κ);
wherein a proportion of Cr in said anti-abrasive layer is more than 65 at %; a proportion of Al is 10 to 25 at %; and a proportion of Ti is 10 to 25 at %, based on a total amount of metal atoms in said anti-abrasive layer.

In another embodiment, the present invention provides an anti-abrasive layer, comprising:

nitrides of the metal elements Cr, Ti and Al; and
a two strata layer structure;
wherein a bottom stratum comprises a base layer selected from the group consisting of a (TiAlCr)N layer, a (TiAlCrκ)N layer and combinations thereof,
wherein said bottom stratum is covered by a CrN top layer as upper stratum;
wherein the base layer comprises
more than 30 at % of Cr;
15 to 35 at % of Al; and
16 to 40 at % of Ti,
based on the total metal atom content of the entire layer.

In yet another embodiment, the present invention relates to a tool, comprising an anti-abrasive layer as defined above.

BRIEF DESCRIPTION OF THE DRAWING

The FIGURE shows a comparison of tool life for different anti-abrasive layers.

DETAILED DESCRIPTION OF THE INVENTION

The present invention relates to hard anti-abrasive layers for tools and the tools having the anti-abrasive layers.

Suitable tools are cutting tools such as inserts and hobs, in particular rotating shank tools such as drills, countersinks and counterbores, tapping tools, screw taps, reamers, milling tools etc. for cutting metals. The anti-abrasive layers are hard material layers with a thickness of approximately 1 to 7 μm which are preferably deposited by PVD (physical vapour deposition) onto the tool surface.

The present invention is different from the inventor's own earlier German patent application P 102 12 383, for example, due to the use of smaller amounts of Ti and Al. P 102 12 383 is incorporated herein by reference.

In the course of the development of the present invention, tools were made from HSS (high speed steel) and hard metal with different layers and layer systems of the following components: nitrides of the metals chromium, aluminium and titanium and a small addition (up to approximately 1 at % based on the total amount of metal atoms in the anti-abrasive layer) of yttrium for grain refining. Preferably, yttrium is present. Within the context of the present invention, at % refers to atomic %.

The following processes were performed to develop the anti-abrasive layer according to the present invention: (1) coating, (2) analysis of the layer composition, phase determination and texture examination, (3) milling trials with different use parameters, (4) measuring of the abrasion behaviour during the tests, (5) evaluation and results, (6) coating of the same tools with a layer with a modified percentage composition of the metal atoms etc.

It was found that the best anti-abrasion behaviour is achieved in the case of highly abrasive applications by increasing the proportion of Cr, according to the present invention, in the entire layer with respect to the total metal atom content to values of more than 65 at %. The amount of Cr in the entire layer based on the total metal atom content is preferably 66 to 70 at %, more preferably more than 70 at %, even more preferably more than 80 at % and most preferably more than 90 at %. The amount of Cr in the base layer only is preferably >30 at %. The proportions of Al and Ti are correspondingly reduced to 10-25 at % or 10-15 at %. The amount of Al is preferably 10-25 at %, more preferably 10-23 at %, even more preferably 15-25 at %, and even more preferably 17-25 at %, and most preferably 10-15 at % based on the total amount of metal atoms in the anti-abrasive layer. The amount of Al includes all values and subvalues therebetween, especially including 11, 12, 13, 14, 15, 16, 17, 18, 19, 20, 21, 22, 23 and 24 at %. The amount of Ti is preferably 10-25 at %, and more preferably 10 to 15 at %, based on the total metal atom content in the layer. The amount of Ti includes all values and subvalues therebetween, especially including 11, 12, 13, 14, 15, 16, 17, 18, 19, 20, 21, 22, 23 and 24 at %, based on the total metal atom content in the anti-abrasive layer.

In a preferred embodiment, the anti-abrasive layer comprises 10-25 at % of Ti based on the total amount of the metal atom content in the anti-abrasive layer. At the same time the amount of Cr is >65 at %, preferably >70 at %. The amount of Al is preferably 10-25 at %. This is particularly advantageous for dry working of metals, cutting with minimum quantities of lubrication and for high speed cutting. One reason for using the described amounts of Ti and Cr is the high temperature corrosion of the oxides of Ti and Cr. Oxidation resistance at high temperatures (up to 1000° C.) depends on the development of a protective oxide layer of chromium oxide or aluminium oxide ($Cr_2O_3$ and $Al_2O_3$) at the surface. On the other hand, titanium oxides such as $TiO_2$ are less useful as protective layers.

In addition, the oxide and nitrides of the elements Ti, Cr and Al influence the stability of the hot hardness at high temperatures (>950° C.). A reduction of the titanium amount combined with an increase of the content of Cr results in improved hot hardness. A reduction in layer hardness occurs only at high temperatures (>1000° C.).

Further, the combination of the mentioned amount of Ti (10-25 at %) and Cr (>65 at %, preferably >70 at %) results in improved heat resistance of the anti-abrasive layer and excellent heat insulation by CrN and (Al,Ti)N. As a result, the heat that develops during the cutting process using the tool, can be removed via the chips obtained during the cutting. All of the above mentioned advantages are achieved in particular when combining 10-25 at % of Ti, 10-25 at % of Al and >65 at %, preferably >70 at % of Cr, based on the total amount of metal atoms in the anti-abrasive layer.

As shown by the comparative application tests below, using the anti-abrasive layer of the present invention, it was possible to extend the tool lives decisively, compared with the state of the art, namely almost 2.5 times.

In a preferred embodiment of the present invention, the inventor has found that particularly long tool lives can be obtained by using an anti-abrasive layer which comprises nitrides with the metal elements Cr, Ti and Al and preferably a small proportion of the elements (κ) for grain refining, wherein the structure contains two strata layer, the bottom stratum being formed by a thicker (TiAlCr)N and/or (TiAlCrκ)N base layer with the composition as a homogeneous phase which is covered by a thinner CrN top layer as upper stratum. The base layer has a proportion of Cr of more than 30 at %, preferably 30 to 65 at %; a proportion of Al 15 to 35 at %, preferably 17 to 25 at %; and a proportion of Ti of 16 to 40 at %, preferably 16 to 35 at %, particularly preferably 24 to 35 at %, based on all the metal atoms in the entire layer, respectively. The base layer is preferably in contact with the metal tool.

The above layer provides longer tool lives if the thicker base layer is covered by a thin CrN layer, a high proportion of Cr (>65 at %, preferably >70 at %) in the total anti-abrasive layer being preferred.

An intermediate layer may be included between base layer and top layer. Such intermediate layer may comprise preferably CrN, TiN or (TiAlCr)N.

A particularly abrasion-resistant layer which is suitable for the most difficultly cuttable materials is obtained if the anti-abrasive layer has two strata, the bottom stratum being formed by a thicker (TiAlCrκ)N base layer with the composition as a homogeneous mixed phase which is covered by a thinner CrN top layer as upper stratum. The thickness of the bottom layer is preferably between 1 and 6 μm and the thickness of the thinner top coat at between 0.15 and 0.6 μm. The thickness of the base layer includes all values and subvalues therebetween, especially including 1.5, 2, 2.5, 3, 3.5, 4, 4.5, 5 and 5.5 μm. The thickness of the top layer includes all values and subvalues therebetween, especially including 0.2, 0.25, 0.3, 0.35, 0.4, 0.45, 0.5 and 0.55 μm.

Yttrium is preferably used as the element (κ) for grain refining, the percentage proportion with respect to the total metal atom content of the layer being less than 1 at %, preferably up to approximately 0.5 at %. Preferably, yttrium is present in an amount of from >0 to less than 1 at % and more preferably in an amount of from >0 to about 0.5 at %. The amount of yttrium includes all values and subvalues therebetween, especially including 0.05, 0.1, 0.2, 0.3, 0.4, 0.5, 0.6, 0.7, 0.8, and 0.9 at %. Other elements for grain refining may be included in place of or in addition to yttrium.

While layer thicknesses of up to 8 or even up to 10 μm are possible, the thickness of the anti-abrasive layer as a whole is preferably 1 to 7 μm, since greater thicknesses tend to result in cracks due to the increasing inherent stresses in the layer. The thickness of the anti-abrasive layer includes all values and subvalues therebetween, especially including 1.5, 2, 2.5, 3, 3.5, 4, 4.5, 5, 5.5, 6, 6.5, 7, 7.5, 8, 8.5, 9 and 9.5 μm.

A particularly good layer structure can be achieved if the anti-abrasive layer is deposited by cathodic arc evaporation or high rate magnetron sputtering.

In order to improve the adhesion of the anti-abrasive layer to the tool, the surface of the tool carrying the anti-abrasive layer is preferably subjected to substrate purification by plasma-supported etching using noble gas ions, preferably Ar ions, which can be carried out, for example, by low voltage arc discharge as described in DE 198 18 782 which is incorporated herein by reference.

Having generally described this present invention, a further understanding can be obtained by reference to certain specific examples which are provided herein for purposes of illustration only, and are not intended to be limiting unless otherwise specified.

EXAMPLES

In the following, a preferred embodiment of the anti-abrasion layer according to the present invention is described by way of an example. Reference is made to the FIGURE which, as an example, illustrates average tool lives during milling in titanium with tungsten carbide inlay, a tool coated with metal nitride from the competition, a so-called GÜHRING fire layer (Ti,Al)N/TiN and the layers according to the present invention i.e. with a thicker (Ti,Al,Cr,Y)N base layer and a thinner CrN top layer being compared.

By means of an arc coating process, a single (Ti, Al, Cr, Y)N layer was first deposited onto HSS and hard metal milling tools. A Cr cathode and a (Ti,Al,Y) cathode were used as sources of steam. Process parameters: substrate temperature $T_s$=450° C., bias tension $U_B$=−50 V, total ion stream $J_{ion}$=14 A onto the sample substrate to be coated, cathode stream for the Cr and/or TiAlY cathodes $I_K$=300 A, pure nitrogen plasma (partial nitrogen pressure $p_{N2}$=5 Pa).

The coating process was preceded by substrate purification using plasma-supported etching (bombarding with Ar ions from a low voltage arc discharge). Tools consisting entirely of hard metal were coated. The layer thickness was approximately 2.5 μm.

The determination of the atomic concentration in the layers was carried out by means of sensitivity factors which were determined with Cr, Ti, TiN, TiAlN and $Y_2O_3$ standards. The low proportion of carbon in the layer was disregarded and not taken into consideration when determining the concentration. The concentrations based on the metal atoms in the layer were adjusted in the region of the values according to claims 1 and/or 4 as follows:

| | |
|---|---|
| Proportion of Cr: | 60 at % |
| Proportion of Al: | 16.5 at % |
| Proportion of Ti: | 23 at % |
| Proportion of Y: | 0.5 at % |

The phase determination in the layer was again carried out by X-ray diffraction using $\Theta$–$2\Theta$ geometry with Cu $K_\alpha$ radiation (20 kV). It was possible to show that it consisted of a nitridic mixed phase of the elements Ti, Al and Cr with a <111> texture.

Subsequently, a thin top coat of CrN was deposited on the base layer—again by the arc method. The thickness of the top layer was adjusted to approximately 0.4 μm. The process parameters were:

Substrate temperature $T_s$=450° C., bias tension $U_B$=−50 V, discharge stream for Cr cathode $I_K$=300 A, total ion stream onto the tool to be coated with a CrN deposition $J_{ion}$=9 A, pure nitrogen plasma (partial nitrogen pressure $p_{N2}$=5 Pa).

Thus, an overall layer was obtained in which—based on all metal atoms in the layer—the proportion of Cr amounted to 65.6 at %, the proportion of Al to 14.2 at %, the proportion of Ti to 19.7 at % and the proportion of det Y amounted to 0.5 at %.

Comparative Application Tests:

The hard metal milling cutters with the layer described in the example were tested in a field test regarding their tool life in samples having the following construction: titanium base material with tungsten carbide inlay. A face milling cutter with a diameter of 16 mm was used, the following process parameters being maintained:

Cutting rate 1000 m/min
External oil cooling
Feed dimension ap=25 mm
Feed dimension ae=2.5 mm The number of work pieces can be used as a measure of the achievable tool life which can be worked with the tools with the indicated quality tolerance.

In the comparative tests, milling cutters of identical geometry were provided with conventional layers, i.e. with a conventional metal nitrite layer and a so-called GÜHRING fire coat, i.e. a (TiAl)N/TiN multilayer stratum.

The FIGURE shows that a useful life can be achieved with the tools coated according to the present invention which is more than twice the useful life achievable with a GÜHRING Fire multilayer stratum (Ti,Al)N/TiN. The FIGURE shows the number of parts that can be produced with little standard deviation for a known metal nitride layer, a (Ti,Al)N/TiN layer and a (TiAlCrY)N base layer with thin CrN layer.

By way of the example described above, it was also possible to show that an excellent anti-abrasion behaviour is achieved with the anti-abrasive layer according to the present invention in the case of material extremely difficult to work. A characteristic feature of the anti-abrasive layer continues to be that the base layer is homogeneous as such and represents a homogeneous cubic mixed phase. The yttrium incorporated into the layer serves the purpose of grain refining. In addition, neither the use of an adhesion promoter layer nor a special subsequent thermal treatment are necessary in the case of the manufacture of the anti-abrasive layer according to the present invention such that the anti-abrasive layer according to the present invention can be made in a simple manner.

The coating is preferably deposited by a pure PVD process (cathodic arc evaporation) at substrate temperatures of maximum 450° C.

The total thickness of the anti-abrasive layer is preferably in the region between 1 and 7 μm.

German patent application DE 103 47 981.3 filed Oct. 15, 2003 and International patent application PCT/DE2004/002308, filed Oct. 13, 2004, as well as all patents and references mentioned above are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. An anti-abrasive layer, comprising:
   nitrides of the metal elements Cr, Ti and Al; and
   a two strata layer structure;
   wherein a bottom stratum comprises a base layer selected from the group consisting of a (TiAlCr)N layer, a (TiAlCrκ)N layer and combinations thereof,
   wherein said bottom stratum is covered by a CrN top layer as upper stratum;
   wherein the base layer comprises
   more than 30 at % of Cr;
   15 to 35 at % of Al; and
   16 to 40 at % of Ti,
   based on the total metal atom content of the entire layer.

2. The anti-abrasive layer according to claim 1, comprising less than 1 at % of yttrium as element (κ), based on the total metal atom content of the anti-abrasive layer.

3. The anti-abrasive layer according to claim 1 having a thickness of from 1 to 7 μm.

4. The anti-abrasive layer according to claim 1 wherein a thickness of the bottom layer is from 1 to 6 μm, and a thickness of the top layer is from 0.15 to 0.6 μm.

5. The anti-abrasive layer according to claim 1, which is obtained by cathodic arc evaporation or magnetron sputtering.

6. The anti-abrasive layer according to claim 1, comprising up to about 0.5 at % of yttrium as element (κ), based on the total metal content of the anti-abrasive layer.

7. The anti-abrasive layer according to claim 1, wherein said element (κ) is added for grain refining.

8. The anti-abrasive layer according to claim 1, comprising yttrium as element (κ).

9. The anti-abrasive layer according to claim 1 which is suitable for tools.

10. The anti-abrasive layer according to claim 1 further comprising an intermediate layer;

wherein said intermediate layer is between said based layer and said top layer.

11. A tool, comprising: the anti-abrasive layer according to claim 1.

12. The tool according to claim 11 having no adhesion promoter layer between the tool surface and the anti-abrasive layer.

13. The tool according to claim 11, obtained by purifying a surface of the tool by plasma-supported etching using noble gas ions, thereby obtaining a purified surface; and depositing said anti-abrasive layer on said purified surface.

* * * * *

UNITED STATES PATENT AND TRADEMARK OFFICE
CERTIFICATE OF CORRECTION

PATENT NO. : 7,541,101 B2  
APPLICATION NO. : 11/403829  
DATED : June 2, 2009  
INVENTOR(S) : Weber It is certified that error appears in the above-identified patent and that said Letters Patent is hereby corrected as shown below:

On the title page, the Terminal Disclaimer information has been omitted. Item (45) and the Notice information should read as follows:

--(45) **Date of Patent: * Jun. 2, 2009**

(*) Notice: Subject to any disclaimer, the term of this patent is extended or adjusted under 35 U.S.C. 154(b) by 0 days.

This patent is subject to a terminal disclaimer.--

Signed and Sealed this

Fourteenth Day of July, 2009

JOHN DOLL  
*Acting Director of the United States Patent and Trademark Office*